UNITED STATES PATENT OFFICE.

H. B. BABCOCK, OF NEW YORK, N. Y.

IMPROVEMENT IN METALLIC ALLOYS.

Specification forming part of Letters Patent No. 6,502, dated June 5, 1849.

*To all whom it may concern:*

Be it known that I, HERMAN B. BABCOCK, of the city and county and State of New York, have invented and discovered a new and useful combination of and process of combining zinc and iron by which I form composition that is a slow conductor of heat, is of greater strength and durability than iron, is capable of being very highly polished, and is less affected by friction and more peculiarly adapted and useful than any other substance for boxes for the journals or axles of locomotive-engines and railroad-cars, for the connecting-boxes and the cross-head boxes and journals for the same to run upon in steam-engines, of carriage and wagon wheel boxes, and other parts of engines and machinery where there is usually much friction and heat arising from rapidity of motion, and for machinery that requires a high polish, for cylinder-rings, steam-cylinders, hydraulic-pressure pumps and steam-cocks, and for reflectors for lamps and burners, and door and other plates requiring a high polish, and for gas-pipes, caldrons, and sugar and dyers' kettles, of which the following is a full and exact description.

I take seventy-eight parts of Scotch iron and twenty-two parts of zinc. I melt the iron by itself by the use of only sufficient heat for that purpose. I then melt the zinc by itself in a ladle, crucible, or other suitable vessel, and apply sufficient heat to the zinc to raise its temperature equal, or nearly equal, to the temperature of the fused iron, so that when the two metals are ready to be combined they shall both be as nearly as practicable of the same temperature. While the metals are in a fused state, and before combining them, I prefer to purify and cleanse them thus: With the zinc I mix sal-ammoniac and rosin in the proportions of half a pound of each to twenty pounds of zinc, and then from each metal I skim the dross and impurities which float upon their respective surfaces. The two metals thus prepared are ready to be combined, and to combine them I then place a vessel in the form of an inverted funnel over the vessel containing the iron, having a pipe to carry away the smoke and noxious gases produced by the combination within, through a hole in the side of the cover. I pour the zinc into the vessel containing the iron, and the composition will be formed by the union of the two, immediately after which said composition may be poured into molds to form whatever articles are to be made of it. I can also use American iron instead of Scotch iron, and in that case I find the following proportions to be best, namely: eighty-four parts of iron to sixteen parts of zinc. The process in each case is the same, and the results will be similar. Although I prefer the proportions above described as being best, I however wish to be understood as not intending to confine myself to those proportions nor to the practice of purifying the zinc and iron, as above described, before combining them. I state the mode of purifying because when the metals are so purified the composition will be better than when not.

I will add that it is obvious that any known apparatus which shall be found convenient can be used instead of that described.

What I claim as my invention and discovery, and desire to secure by Letters Patent, is—

The composition, as described, composed of zinc and iron combined with each other when in a fused state, and the application and use of said composition to the purposes above specified, and to any other useful purpose to which it may be applied.

H. B. BABCOCK.

Witnesses:
H. P. ALLEN,
A. L. ALLEN.